(12) United States Patent
Davidson et al.

(10) Patent No.: US 11,027,358 B2
(45) Date of Patent: Jun. 8, 2021

(54) SYSTEMS AND METHODS FOR AUTO-TUNING A GMAW WELDING PROCESS

(71) Applicant: Illinois Tool Works Inc., Glenview, IL (US)

(72) Inventors: Robert R. Davidson, New London, WI (US); Valarie Schwartz, Appleton, WI (US); Dustin Wagner, Greenville, WI (US)

(73) Assignee: Illinois Tool Works, Glenview, IL (US)

(*) Notice: Subject to any disclaimer, the term of this patent is extended or adjusted under 35 U.S.C. 154(b) by 333 days.

(21) Appl. No.: 16/119,890

(22) Filed: Aug. 31, 2018

(65) Prior Publication Data
US 2020/0070270 A1    Mar. 5, 2020

(51) Int. Cl.
B23K 11/24    (2006.01)
B23K 11/26    (2006.01)
B23K 9/10    (2006.01)
H02M 1/00    (2006.01)

(52) U.S. Cl.
CPC ... B23K 9/1043 (2013.01); *H02M 2001/0003* (2013.01)

(58) Field of Classification Search
CPC ...... B23K 9/1006–1037; B23K 9/1043; B23K 9/1056–1068; B23K 11/24–246; B23K 11/25–258
See application file for complete search history.

(56) References Cited

U.S. PATENT DOCUMENTS

| | | | |
|---|---|---|---|
| 5,063,282 A | 11/1991 | Gilliland | |
| 6,248,975 B1 | 6/2001 | Lanouette et al. | |
| 8,546,726 B2 | 10/2013 | Vogel | |
| 2004/0095788 A1* | 5/2004 | Manthe | B23K 9/1062 363/125 |
| 2010/0065539 A1 | 3/2010 | Daniel | |
| 2011/0163072 A1 | 7/2011 | Vogel | |
| 2013/0327752 A1* | 12/2013 | Salsich | B23K 9/09 219/137.71 |

(Continued)

FOREIGN PATENT DOCUMENTS

| | | |
|---|---|---|
| JP | 2006-116546 A | 5/2006 |
| JP | 2013146772 | 8/2013 |

OTHER PUBLICATIONS

Int'l Search Report and Written Opinion Appln No. PCT/US2019/044181 dated Feb. 10, 2020.

*Primary Examiner* — Michael A LaFlame, Jr.
(74) *Attorney, Agent, or Firm* — McAndrews, Held & Malloy, Ltd.

(57) ABSTRACT

Systems and methods for auto-tuning a MIG welding process are disclosed. A welding-type power supply may include a power conversion circuitry configured to convert input power to welding-type power; and a controller configured to control the power conversion circuitry based on a plurality of operating parameters. The operating parameters may include an inductance parameter, a slope parameter, or a wet time parameter. During the welding process, in order to control the power conversion circuitry, the system may measure an output from the power conversion circuitry, and may update the inductance parameter, the slope parameter, or the wet time parameter.

20 Claims, 11 Drawing Sheets

(56) References Cited

U.S. PATENT DOCUMENTS

2013/0327754 A1* 12/2013 Salsich ............... B23K 9/1043
219/137.71
2015/0283652 A1  10/2015 Pfeifer
2016/0110663 A1   4/2016 Miller et al.
2018/0367050 A1* 12/2018 Mnich .................. B23K 9/16

* cited by examiner

SYSTEMS AND METHODS FOR AUTO-TUNING A GMAW WELDING PROCESS

TECHNICAL FIELD

This disclosure relates generally to welding-type power supplies and, more particularly, to systems and methods for auto-tuning a GMAW welding process.

BACKGROUND

Welding-type components (e.g., welding torches) are sometimes powered by welding-type power supplies. Conventional power supplies use a range of electrical components and/or electrical circuitry to produce appropriate welding-type power for various welding-type operations and/or welding-type components.

Conventional short circuit gas metal arc welding (GMAW), also referred to as metal inert gas (MIG) welding, is a welding process in which an electric arc forms between an electrode and pieces of metal that are to be welded. The electric arc generates heat that causes the pieces of metal to melt. Upon cooling down of the melted pieces of metal, the pieces of metal join and form a weld. Electrical and/or physical parameters can be adjusted to give the best electric arc possible and improve the overall welding process.

SUMMARY

The present disclosure is directed to systems and methods for auto-tuning a GMAW welding process, substantially as illustrated by and/or described in connection with at least one of the figures, and as set forth in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
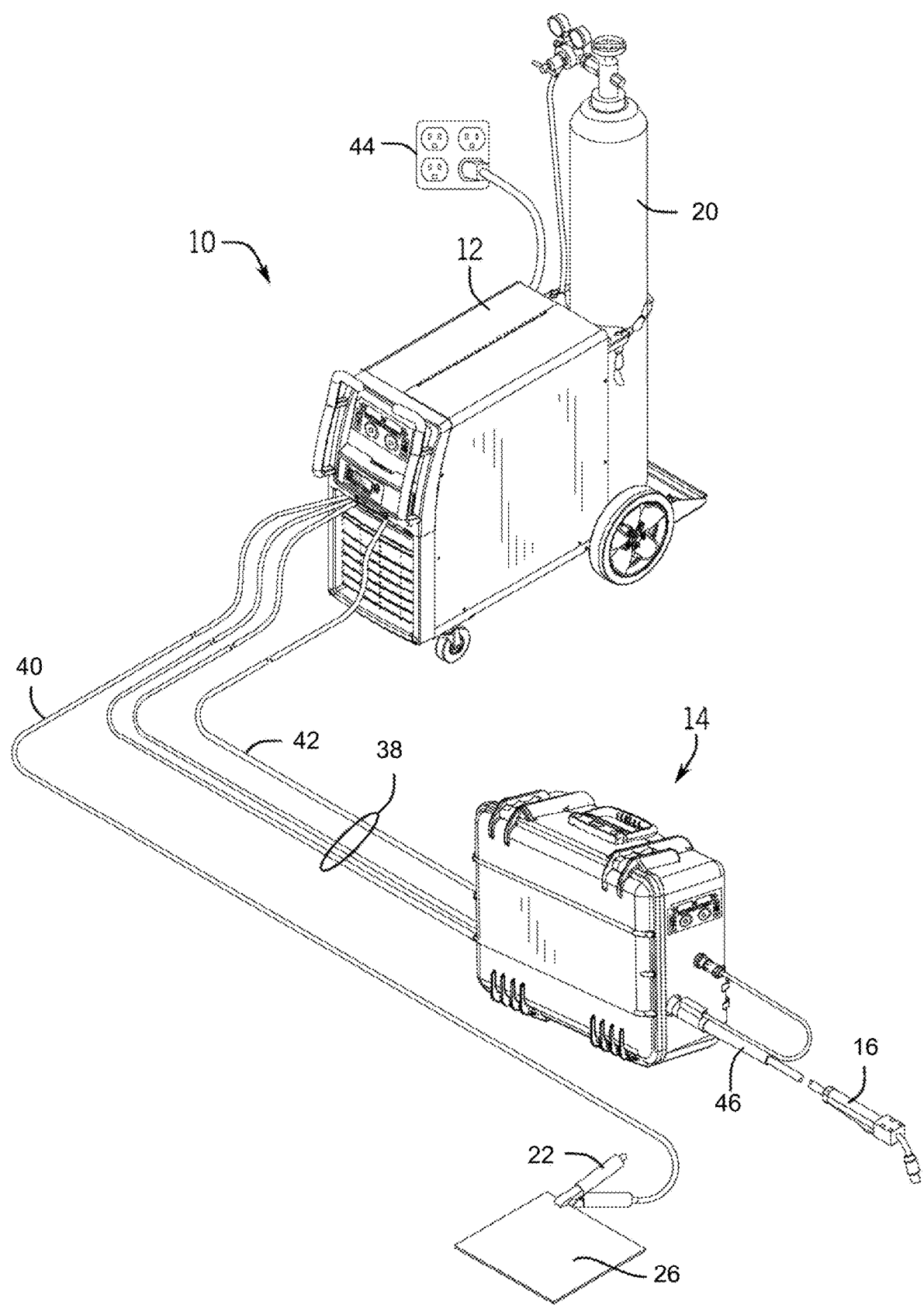
FIG. 1 is a diagram of an example welding-type system in accordance with aspects of this disclosure.

Examples of the present disclosure may be described herein below with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

As used herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, a welding-type power supply refers to any device capable of, when power is applied thereto, supplying suitable power for welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Systems and methods for automatically tuning parameters for a GMAW welding process are disclosed. In some disclosed examples, a welding-type power supply modifies parameters that influence the performance of a welding operation. Example parameters include short circuit parameters such as inductance, slope, and wet time parameters. Conventionally, these parameters are undefined, predetermined by the manufacturer, and/or rarely or never modified after manufacture.

Disclosed systems and methods improve arc performance by adjusting (e.g., improving, optimizing) short circuit parameters based on the observed characteristics of the weld operation. By adjusting the short circuit parameters, disclosed systems and methods improve arc stability and/or reduce spatter in short arc GMAW processes. The short circuit parameters may be adjusted in real-time, periodically, and/or in response to triggers, to improve the arc performance despite changing welding conditions. In some examples, the slope, inductance, and/or wet time parameters are determined by executing a PID control loop (proportional, integral, and derivative, and/or any combination of these).

Disclosed example welding-type power supplies include: power conversion circuitry configured to convert input power to welding-type power; and a controller configured to control the power conversion circuitry based on a plurality of short circuit parameters, the short circuit parameters including at least one of an inductance parameter, a slope parameter, or a wet time parameter by, during a welding-type operation: measuring an output from the power conversion circuitry; and updating values for at least one of the inductance parameter, the slope parameter, or the wet time parameter, to control the power conversion circuitry.

In some examples, the controller is configured to determine an updated value for the inductance parameter based on a measured output voltage, a commanded output voltage, a measured short circuit event duration, and a measured current change during a short circuit event. In some such examples, the controller is configured to determine the updated value for the inductance parameter based on the following equation:

$$L = \frac{V}{d_i} d_t,$$

where L is the updated value of the inductance parameter, V is a difference between the commanded output voltage and a representative output voltage value for one or more short circuit clearing events, dt is a representative short circuit event duration, and di is a representative current change for one or more short circuit events. In some examples, the representative output voltage value is an average instantaneous voltage measured at the times the one or more short circuit events were cleared, the representative short circuit event duration is an average short circuit event duration, and the representative current change is an average current change during the one or more short circuit events.

In some examples, the controller is configured to determine an updated value for the inductance parameter by determining an inductance value that would cause an increase of an average peak short circuit current of one or more short circuit events during the welding-type operation over an average duration of the one or more short circuit events. In some example welding-type power supplies, the controller is configured to determine an updated value for the slope parameter based on a measured peak current during a short circuit event, a measured peak voltage during the short circuit event, and a commanded output voltage. In some examples, the controller is configured to determine the updated value for the slope parameter based on the following equation:

$$S = \frac{(V_{cmd} - V_{peak})}{I_{peak}},$$

where S is the updated value for the slope parameter, $V_{cmd}$ is the voltage command, $V_{peak}$ is the measured peak voltage during the short circuit event, and $I_{peak}$ is the measured peak current during the short circuit event. In some examples, the controller is configured to determine the updated value for the slope parameter based on the following equation:

$$S = \frac{(V_{cmd} - V_{peak})}{I_{peak}},$$

where S is the updated value for the slope parameter, $V_{cmd}$ is the voltage command, $V_{peak}$ is the average measured peak voltage during one or more short circuit events including the short circuit event, and $I_{peak}$ is the measured peak current during the one or more short circuit events.

In some example welding-type power supplies, the controller is configured to determine an updated value for the wet time parameter based on durations of one or more short circuit events in which the durations are less than a threshold duration. In some examples, the threshold duration is based on a representative short circuit event duration. In some examples, the controller is configured to determine the updated value by: determining an average short circuit duration for the one or more short circuit events during the welding-type operation; determining the threshold duration based on the average short circuit duration; identifying one or more of the short circuit events having durations less than the threshold duration; and determining the wet time parameter based on an average of the identified one or more short circuit events. In some examples, the controller is configured to reduce the slope parameter in response to a duration of a short circuit event exceeding a threshold duration.

Disclosed example methods include: converting, via power conversion circuitry, input power to welding-type power during a welding-type operation; measuring, via control circuitry, an output from the power conversion circuitry during the welding-type operation; updating, via control circuitry, values for at least one of an inductance parameter, a slope parameter, or a wet time parameter, to control the power conversion circuitry during the welding-type operation; and controlling, during the welding-type operation via control circuitry, the power conversion circuitry based on the at least one of the inductance parameter, the slope parameter, or the wet time parameter.

In some example methods, the updating the value for the inductance parameter is based on a measured output voltage, a commanded output voltage, a measured short circuit event duration, and a measured current change during a short circuit event. In some examples, the updating the value for the inductance parameter is based on the following equation:

$$L = \frac{V}{d_i} d_t,$$

where L is the updated value of the inductance parameter, V is a difference between the commanded output voltage and a representative output voltage value for one or more short circuit clearing events, $d_t$ is a representative short circuit event duration, and $d_i$ is a representative current change for one or more short circuit events.

In some examples, the updating the value for the slope parameter is based on a measured peak current during a short circuit event, a measured peak voltage during the short circuit event, and a commanded output voltage. In some example methods, the updating the value for the slope parameter is based on the following equation:

$$S = \frac{(V_{cmd} - V_{peak})}{I_{peak}},$$

where S is the updated value for the slope parameter, $V_{cmd}$ is the voltage command, $V_{peak}$ is the measured peak voltage during the short circuit event, and $I_{peak}$ is the measured peak current during the short circuit event.

In some examples, the updating of the value of the wet time parameter is based on durations of one or more short circuit events in which the durations are less than a threshold duration. In some example methods, the threshold duration is based on a representative short circuit event duration. In some example methods, the updating of the value of the wet time parameter includes: determining an average short circuit duration for the one or more short circuit events during the welding-type operation; determining the threshold duration based on the average short circuit duration; identifying one or more of the short circuit events having durations less than the threshold duration; and determining the wet time parameter based on an average of the identified one or more short circuit events.

Figure 2:
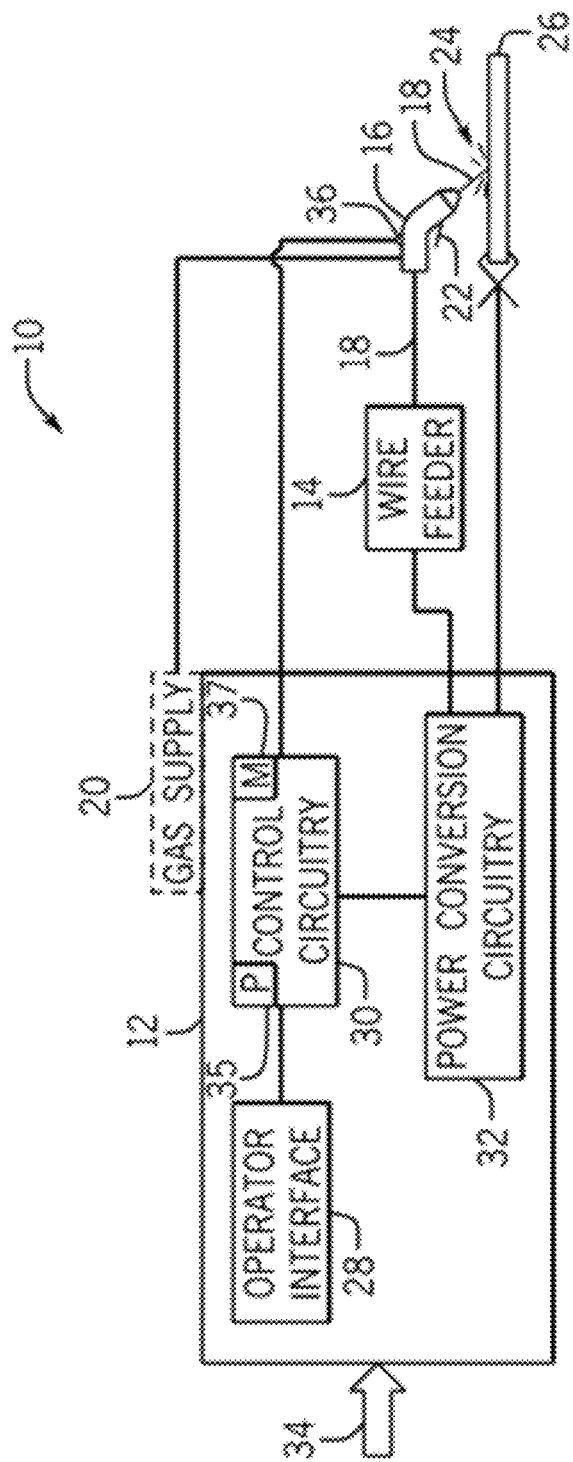
FIG. 2 is a block diagram of the example welding-type system of FIG. 1 in accordance with aspects of this disclosure.

FIGS. 1 and 2 show a perspective view and block diagram view, respectively, of an example of a welding-type system 10 in accordance with aspects of this disclosure. It should be appreciated that, while the example welding-type system 10 shown in FIGS. 1 and 2 may be described as a metal inert gas (MIG) welding, which is sometimes referred to as gas metal arc welding (GMAW) system, disclosed systems and methods may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes).

In the example of FIG. 1, the welding-type system 10 includes a welding-type power supply 12 (i.e., a welding-type power source), a welding wire feeder 14, a gas supply 20, and a welding torch 16. The welding-type power supply 12 generally supplies power for the welding-type system 10 and/or other various accessories, and may be coupled to the welding wire feeder 14 via one or more weld cables 38, as well as coupled to a work piece 26 using a lead cable 40 having a clamp 22. In the illustrated example, the welding wire feeder 14 is coupled to the welding torch 16 via coupler 46 in order to supply welding wire and/or welding-type power to the welding torch 16 during operation of the welding-type system 10. In some examples, the welding-type power supply 12 may couple and/or directly supply welding-type power to the welding torch 16. In the illustrated example, the power supply 12 is separate from the wire feeder 14, such that the wire feeder 14 may be positioned at some distance from the power supply 12 near a welding location. However, it should be understood that the wire feeder 14, in some examples, may be integral with the power supply 12.

In the examples of FIGS. 1 and 2, the welding-type system 10 includes a gas supply 20 that may supply a shielding gas and/or shielding gas mixtures to the welding torch 16. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In the example of FIG. 1, the gas supply 20 is coupled to the welding torch 16 through the wire feeder 14 via a gas conduit 42 that is part of the weld cables 38 from the welding-type power supply 12. In such an example, the welding wire feeder 14 may regulate the flow of gas from the gas supply 20 to the welding torch 16. In the example of FIG. 2, the gas supply 20 is depicted as coupled directly to the welding torch 16 rather than being coupled to the welding torch 16 through the wire feeder 14.

In the example of FIG. 2, the wire feeder 14 supplies a wire electrode 18 (e.g., solid wire, cored wire, coated wire) to the torch 16. The gas supply 20, which may be integral with or separate from the power supply 12, supplies a gas (e.g., CO2, argon) to the torch 16. In some examples, no gas supply 20 may be used. The welding-type power supply 12 may power the welding wire feeder 14 that, in turn, powers the welding torch 16, in accordance with demands of the welding-type system 10. The lead cable 40 terminating in the clamp 22 couples the welding-type power supply 12 to the work piece 26 to close the circuit between the welding-type power supply 12, the work piece 26, and the welding torch 16. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In the example of FIG. 2, the welding-type power supply 12 includes an operator interface 28, control circuitry 30, and power conversion circuitry 32. In some examples, the welding-type system 10 may receive weld settings from the operator via the operator interface 28 provided on the power supply 12 (and/or power source housing, such as on a front panel of the power source housing, for example). The weld settings may relate to the type of welding-type power desired. In the example of FIG. 2, the operator interface 28 is coupled to the control circuitry 30, and may communicate the weld settings to the control circuitry 30 via this coupling.

In the example of FIG. 2, the welding-type power supply 12 includes power conversion circuitry 32 that receives input power from a power source (e.g., the AC power grid, an engine/generator set, or a combination thereof), conditions the input power, and provides DC and/or AC welding-type output power via the weld cable(s) 38 and/or lead cable 40. In the example of FIG. 2, the source of electrical power is indicated by arrow 34. The source may be a power grid, an engine-driven generator, batteries, fuel cells or other alternative sources. In the example of FIG. 1, the source is an electrical outlet 44. The power conversion circuitry 32 may include circuit elements (e.g., transformers, rectifiers, capacitors, inductors, diodes, transistors, switches, and so forth) capable of converting the AC input power to a direct current electrode positive (DCEP) output, direct current electrode negative (DCEN) output, DC variable polarity, and/or a variable balance (e.g., balanced or unbalanced) AC output, as dictated by the demands of the welding-type system 10 (e.g., based on the type of welding process performed by the welding-type system 10, and so forth).

In the example of FIG. 2, the control circuitry 30 is coupled to the power conversion circuitry 32. In some examples, the control circuitry 30 operates to control the conversion circuitry 32, so as to ensure the conversion circuitry 32 generates the appropriate welding-type power for carrying out the desired welding-type operation. In some examples, the control circuitry 30 may control the power conversion circuitry 32 to produce an appropriate and/or desired current and/or voltage of the welding-type power supplied to the torch 16, as selected, for example, by an operator through the operator interface 28.

In the example of FIG. 2, the control circuitry comprises one or more processors 35 and/or memory 37. The processor(s) 35 may include one or more microprocessors, such as one or more "general-purpose" microprocessors, one or more special-purpose microprocessors and/or application specific integrated circuits (ASICS), or some combination thereof. For example, the processor(s) may include one or more reduced instruction set (RISC) processors (e.g., Advanced RISC Machine (ARM) processors), one or more digital signal processors (DSPs), and/or other appropriate processors. The one or more processors 35 may use data stored in the memory 37 to execute control algorithms. The data stored in the memory 37 may be received via the operator interface 28, one or more input/output ports, a network connection, and/or be preloaded prior to assembly of the control circuitry 30.

The control circuitry 30 monitors the current and/or voltage of the arc 24 using one or more sensors 36 positioned on, within, along, and/or proximate to the wire feeder 14, weld cable 38, power source 12, and/or torch 16. The one or more sensors 36 may comprise, for example, current sensors, voltage sensors, impedance sensors, temperature sensors, acoustic sensors, and/or other appropriate sensors. In some examples, the control circuitry 30 may determine and/or control the power conversion circuitry 32 to produce an appropriate power output, arc length, and/or electrode extension based at least in part on feedback from the sensors 36.

As described previously, short circuit GMAW is a process that transfers molten metal into the puddle during the short cycle between the wire and the puddle. Short circuit GMAW is typically controlled based on a target voltage command and a wire feed speed (WFS) command, but may be controlled based on a target voltage command and current. Target voltage and WFS values are often specified in a weld procedure. The weld procedure will include such things as commands, actual average current limits, actual average voltage limits, and/or other electrical parameters, parameters defining the weld joint, weld dimensions, and/or other specifications. The example welding-type system 10 of FIGS. 1 and 2 adjust parameters to improve the arc at the defined weld commands and weld procedure. Some example parameters that are adjusted may be infrequently adjusted by end users or operators, and/or may be preset by manufacturers of conventional equipment with little or no control left to the operator. Example parameters that are modified (e.g., in real-time) by the control circuitry 30 of the welding-type power supply 12 include an inductance parameter, a slope parameter, and/or a wet time parameter, to improve the arc while maintaining the target weld parameters.

In an inverter-based system (e.g., a system using a switched-mode power supply to implement the power conversion circuitry 32), the inductance parameter (or, simply, inductance) determines the rate of response (or at a very simple model, the ramping rate) to errors in a voltage control loop. When the user sets a voltage command for the weld, the voltage command determines the magnitude of voltage error during a short circuit (e.g., when the actual arc voltage decreases to effectively 0V). The inductance sets the response rate to that voltage error. For example, a voltage command of 20 volts and a short-circuit voltage of 0 volts gives a 20 volt error. The rate of change of current is defined as indicated below in Equations 1 and 2:

$$V = L\frac{di}{dt} \quad \text{Equation 1}$$

$$di = dt\frac{V}{L} \quad \text{Equation 2}$$

where V is the measured voltage error $V_{error}=[V_{cmd}-V_{instantaneous}]$. L is the inductance parameter, dt is the time between samples/calculations, and di is the change to the power source current for the weld. $V_{cmd}$ refers to the command voltage used by the control circuitry 30 in the voltage control loop, and $V_{instantaneous}$ refers to the instantaneous measured voltage.

The slope parameter controls a reduction in voltage command as a function of output current. The slope parameters prevents the output current from increasing above a threshold, which could cause substantial spatter when the short circuit is cleared. The example control circuitry 30 reduces the current based on the slope parameter by reducing the voltage command input to the voltage control loop, which reduces the upper current limit that can be output by the power conversion circuitry 32. The effect of the slope parameters is to reduce the current response (e.g., reduce the peak output current, reduce the rate of response of the current to the short-circuit, etc.). The inductance parameter has a larger effect on the first portion of the current response to a short circuit, and the slope parameters has the larger effect on the later portion of the current response to the short circuit.

The example control circuitry 30 determines a value of the slope parameter using Equation 3 below:

$$V_{cmd}=V_{setpoint}-[(\text{Instantaneous Current})*(\text{Slope in volts}/100\text{ amps})] \quad \text{Equation 3}$$

For example, for a voltage command of 15 volts and a slope of 5V/100 amps, the control circuitry 30 controls the peak short clear current to be less than or equal to 300 amps. Similarly, for a voltage command of 15 volts a slope of 3V/100 amps, the control circuitry 30 controls the peak short clear current to be less than or equal to 500 amps.

The wet time parameter is a delay in the short response (e.g., a delay between the decrease in voltage representative of the short circuit until the control circuitry 30 begins increasing the current). The wet time allows the molten ball of metal on the end of the wire to "wet" into the puddle and/or reduces instances of increasing current in response to "whisker shorts." A whisker short refers to a short circuit in which the wire touches the puddle for a very brief period, but does not deposit a ball in the puddle. Some materials have high surface tension and benefit from a delay prior to increasing the current. For such materials, increasing the current too soon may result in clearing the short with the ball still on the end of the wire and not deposited in the puddle. As a result, at the next short circuit the ball is about twice as big and requires significantly more energy to clear the short circuit. The wet time, which is a brief delay prior to beginning the short response, allows the surface tension to break down and the ball to bond with the puddle. When the current is subsequently increased, the ball remains and the wire is cleared from the puddle.

The control circuitry 30 calculates the wet time parameter uses the observed average of whisker shorts during welding. The whisker time is identified as a short circuit lasting for less than a threshold percentage of the average short circuit duration. For example, the average short time may be 2 milliseconds. The user or the system may set the whisker short threshold, such as a 50% threshold, such that so any shorts under 1 ms (e.g., 50%*2 ms observed average whisker short time) are averaged to determine the wet time parameter. The threshold percentage may not result in a wet time of equal to the duration corresponding to the percentage (e.g., 1 ms in the above example). Instead, the control circuitry 30 averages the whisker shorts that have a duration less than the threshold (e.g., less than 1 ms) to determine the wet time. Example wet ranges may be between 100 to 400 microseconds (□s), although higher numbers may result depending on the application and/or the selected threshold. The control circuitry 30 does not initiate a short circuit response (e.g., a current increase) during the wet time.

While the average whisker short time is used in the foregoing example, other variables or measurements may be used to control the wet time parameter. For example, the whisker short time may be limited to a sampling of the most recent whisker short events and/or the median whisker short time may be used instead of the average. The control circuitry 30 may use statistical deviation and/or variance, and/or enforce a lower limit on a variation time or percentage.

Figure 3:
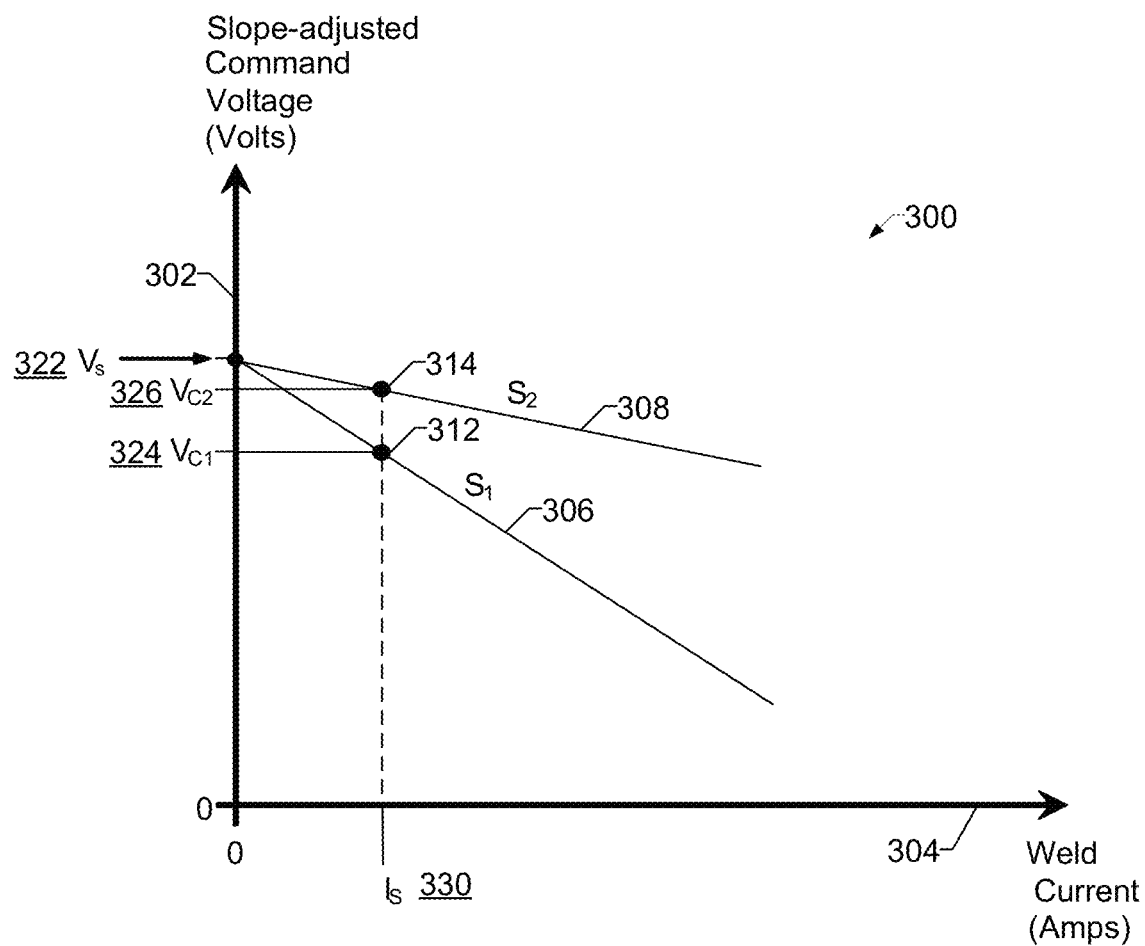
FIG. 3 is a diagram depicting an example volt-ampere slope profile that may be used to control the example welding-type system of FIG. 1.

FIG. 3 is a diagram depicting an example volt-ampere slope profile 300 that may be used to control the example welding-type system 10 of FIG. 1. The vertical axis 302 represents the slope-adjusted command voltage, or the voltage input by the control circuitry 30 to the voltage control loop used to control the power conversion circuitry, in units of volts. The horizontal axis 304 represents the welding current in units of amperes.

Example voltage-amperage curves 306, 308, representing different slope parameters, are illustrated. The slopes of the curves 306, 308 may be represented by the slopes $S_1$ and $S_2$ respectively. In the diagram of FIG. 3, the slope $S_2$ is depicted to be less than the slope $S_1$ (e.g., have a higher current for a given voltage).

FIG. 3 illustrates an example setpoint voltage 322 ($V_s$) corresponding to an output current of 0 Amps. As the current increases, the slope-adjusted command voltage decreases. The effect of the slope-adjusted command voltage may be reduced during open arc phases by other factors in the output control loop executed by the control circuitry 30. During a short circuit event, the control circuitry 30 controls the power conversion circuitry 32 to increase the current (e.g., following the wet time) while attempting to maintain the setpoint voltage 322. FIG. 3 illustrates an example short circuit current point 330 ($I_s$) representing a current during a short circuit event.

When a short circuit event occurs, the control circuitry 30 increases the current in response to detecting the difference between the voltage setpoint 322 and the actual weld voltage. Based on the slope parameter (e.g., $S_1$ or $S_2$), the control circuitry 30 reduces the command voltage from the voltage setpoint 322 as the current increases. For example, as the current increases to an example short circuit current 330 ($I_s$), the control circuitry 30 determines updated command voltages 324, 326 ($V_{c1}$, $V_{c2}$) based on the selected slope parameter 306, 308. At the short circuit current 330 using the slope $S_1$, the example control circuitry 30 determines the voltage command to be the voltage command 324 $V_{c1}$, corresponding to a short circuit operating point 312. Similarly, at the short circuit current 330 using the slope $S_2$, the example control circuitry 30 determines the voltage command to be the voltage command 326 $V_{c2}$, corresponding to a short circuit operating point 314. Because the slope $S_1$ is greater than the slope $S_2$ (e.g., slope $S_1$ results in a larger command voltage drop per unit current than slope $S_2$) the resulting voltage command $V_{c2}$ is greater than the voltage command $V_{c1}$ at the same short circuit current 330.

To determine the voltage command, the control circuitry 30 may define a linear relationship (e.g., the curves 306, 308) using the voltage setpoint 322 and the selected slope $S_1$, $S_2$, and calculate the command voltage based on the linear relationship. Additionally or alternatively, the control circuitry 30 may determine the voltage command based on a difference between the short circuit current 330 and a welding operating current (e.g., an average operating current, the most recent operating current, etc.), and based on the selected slope $S_1$, $S_2$.

Figure 4:
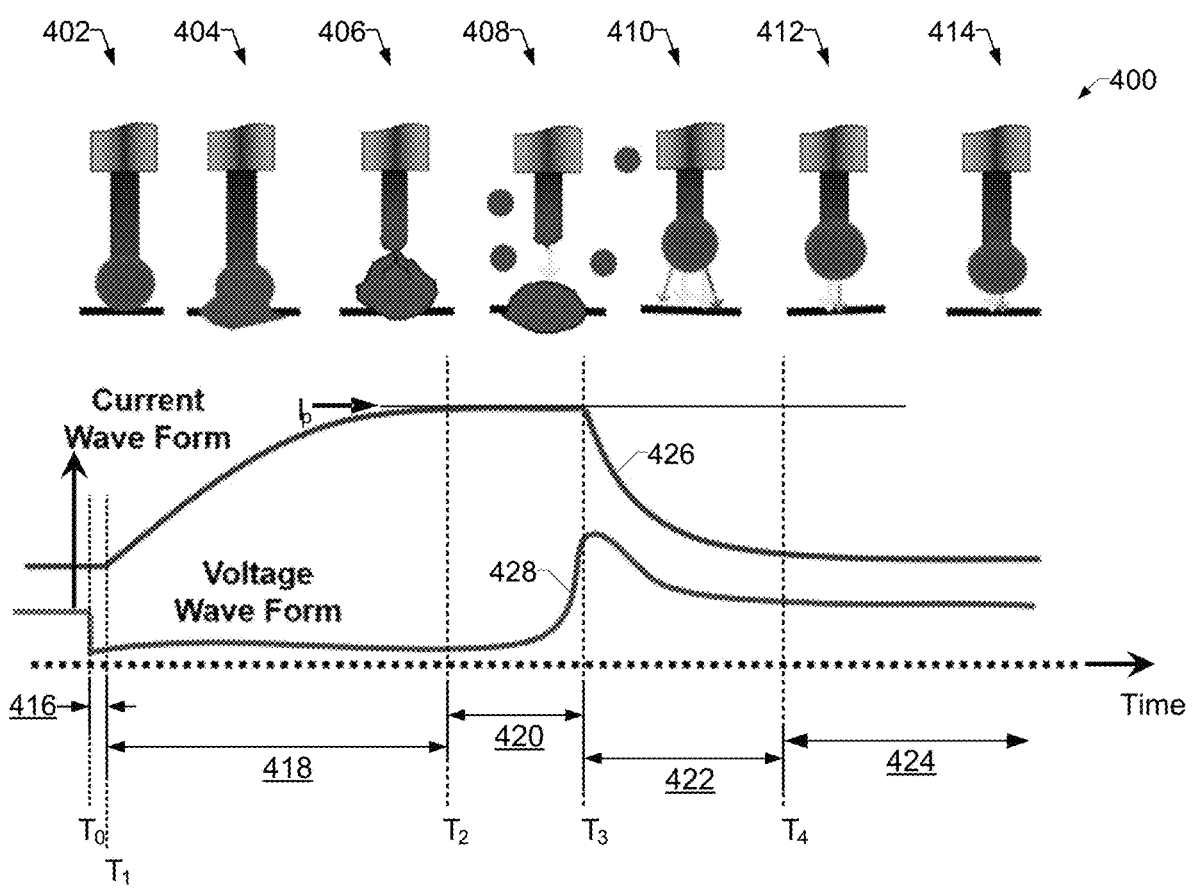
FIG. 4 is a diagram depicting states of an electrode wire tip during different phases of welding cycle for a short arc welding process, and a current waveform corresponding to the states of the electrode wire tip.

FIG. 4 is a diagram depicting states 402-414 of an electrode wire tip 400 during different phases 416-428 of a welding cycle for a short arc welding process, a current waveform 426, and a voltage waveform 428, corresponding to the states 402-414 of the electrode wire tip 400. While the present disclosure will be illustrated with reference to a particular system that provides particular waveforms, and particular algorithms, it should be understood at the outset that the disclosure can also be implemented with other systems, other waveforms, using other algorithms, and for other processes. Generally, the disclosure provides a way to reduce the current prior to the short clearing, resulting in less of a likelihood of spatter and puddle disturbance.

During a wetting phase 416, starting at time $T_0$, the ball is wetting into the puddle as illustrated in state 402 of the electrode wire tip 400. The control circuitry 30 may control the duration of the wetting phase 416 based on the wetting time parameter. During a ramp phase 418, starting at time $T_1$, the current ramps up and the ball begins to transfer to the puddle as illustrated in states 404 and 406. A peak phase 420, starting at time $T_2$, results from the current 426 reaching an upper limit on the current output (e.g., current peak $I_p$). The current peak $I_p$ may be determined by the slope parameter and/or another current limit. The control circuitry 30 controls the output current based on the inductance and/or slope parameters during the slope phase 418 and/or the peak phase 420.

After the ball is deposited into the weld puddle and the arc is reestablished (e.g., at time $T_3$), during a ramp down phase 422, the current ramps down rapidly. During a background phase 424, starting at time $T_4$, the ball continues melting and advances towards the puddle as illustrated by states 412 and 414. The cycle is then repeated.

Figure 5:
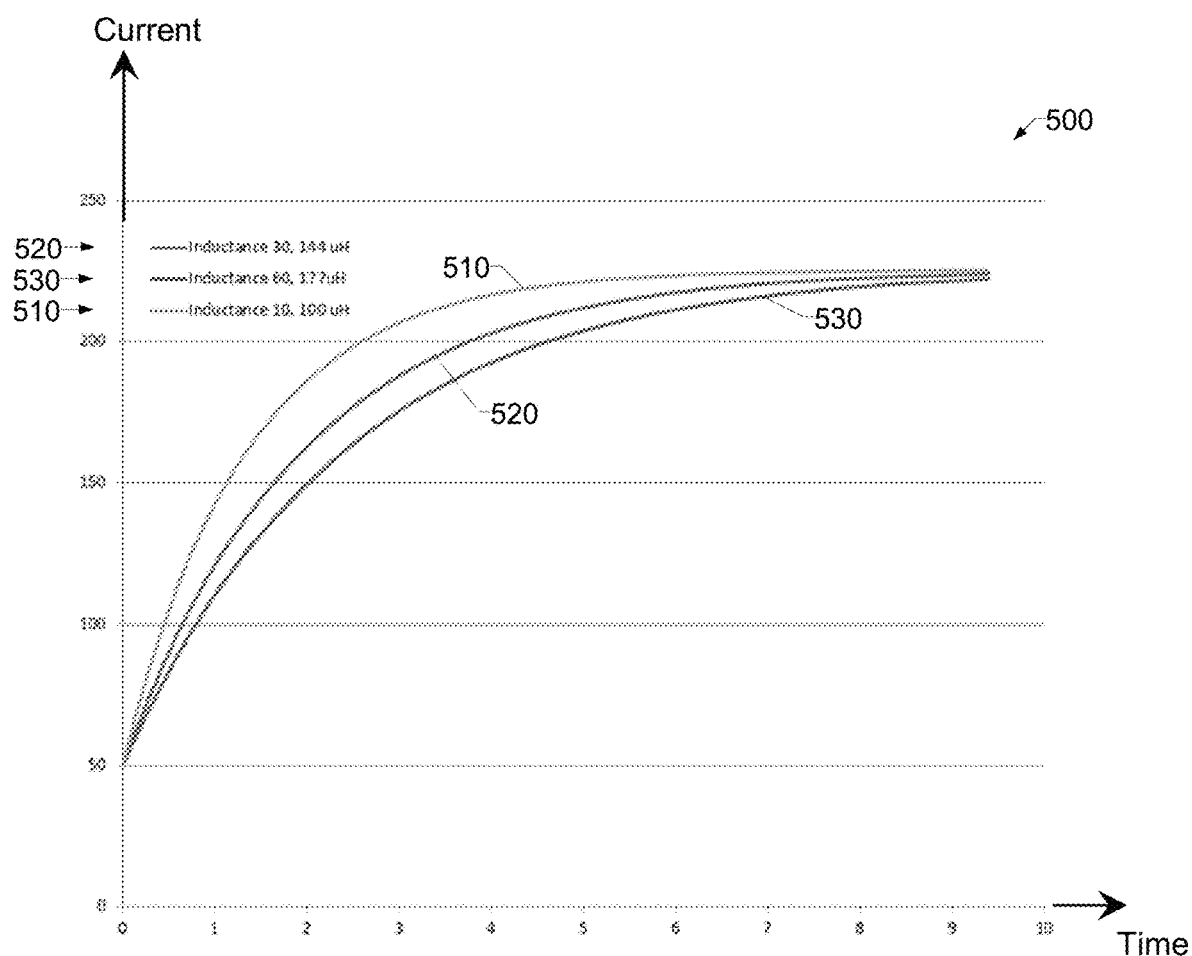
FIG. 5 is a diagram depicting example current response curves for values of the inductance parameter with a fixed value of the slope parameter.

FIG. 5 is a diagram depicting example current response curves 510, 520, 530 for values of the inductance parameter with a same value of the slope parameter (e.g., 5V/100 A). The shape of the current rise response curves 510, 520, 530 depend on the two parameters of slope and inductance. In each of the curves 510, 520, and 530, the current increases from an example value of about 50 amps to a peak value of about 225 amps. However, the rise profile of the current is different for each case of the current curves 510, 520, and 530, due to different values of inductance. Lower inductance values result in a faster rate of current increase than higher inductance values. Thus, the control circuitry 30 may adjust the shape of the current rise profile (e.g., the ramp phase 418 and/or the peak phase 420 of FIG. 4) by adjusting the inductance parameter.

Figure 6:
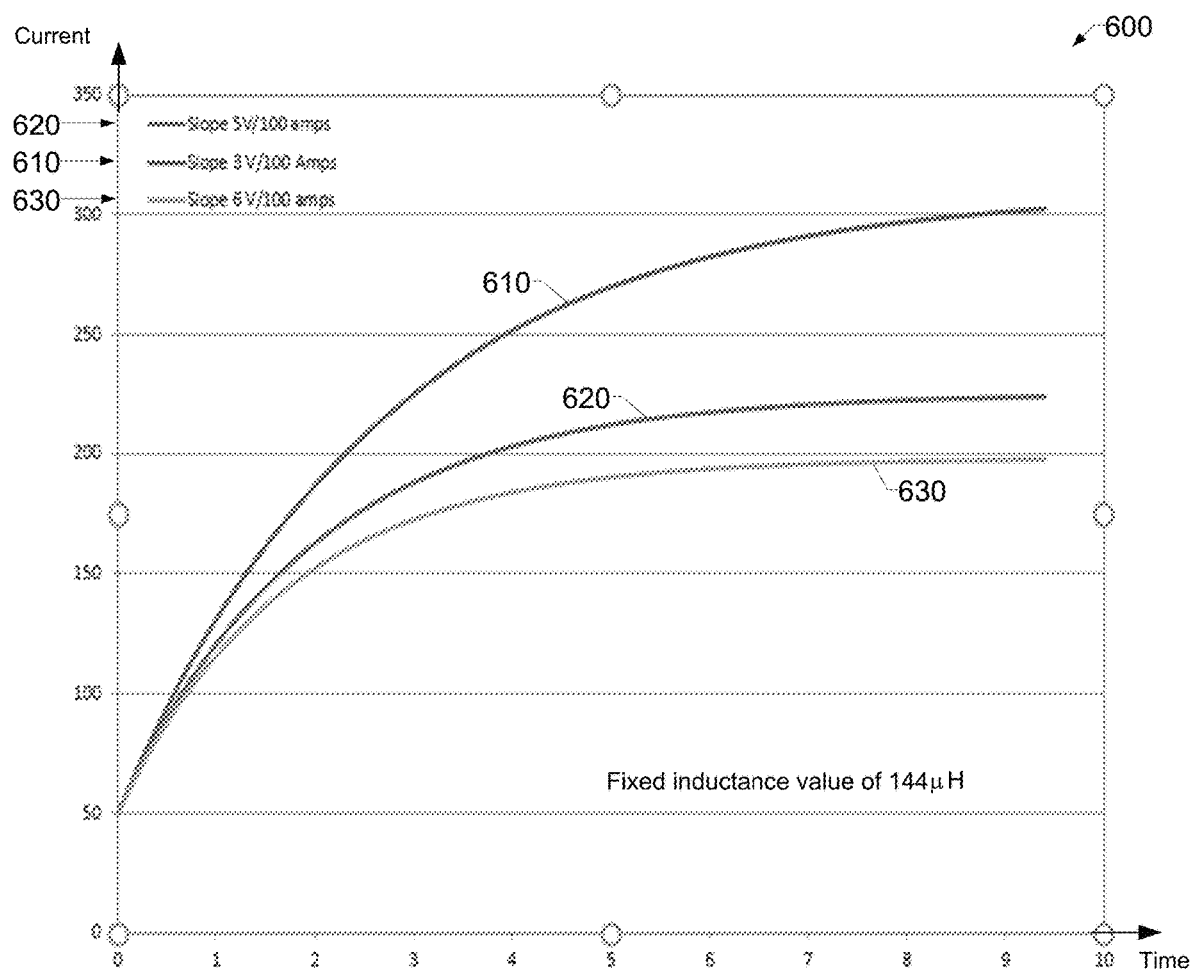
FIG. 6 is a diagram depicting example current response curves for values of the slope parameter with a fixed value of the inductance parameter.

FIG. 6 is a diagram depicting example current response curves 610, 620, 630 for values of the slope parameter with a fixed value of the inductance parameter. The shape of the current rise response curves 610, 620, 630 depend on the slope and inductance parameters. In contrast with the inductance parameter, which controls the rate of initial rise in the current response, the slope parameter controls the rate of rise later in the current response, as well as the upper limit on the current.

The inductance parameter is fixed at 144 microHenries (μH) for each of the curves 610, 620, 630. The curves 610, 620 and 630 depict the current rising from an exemplary value of about 50 amps to peak values of about 300 amps (curve 610), 225 amps (curve 620), and 200 amps (curve 630), respectively. However, the rise profile of the current is different for each case of the current curves 610, 620 and 630 due to different values of slope. Thus, the control circuitry 30 may adjust the shape of the current rise profile (e.g., the ramp phase 418 and/or the peak phase 420 of FIG. 4) by adjusting the slope parameter.

In some examples, the control circuitry 30 makes adjustments to the slope parameter in response to short circuit events that have longer than a threshold duration. During welding, the torch may be weaved or manipulated and these movements can cause the wire to get into some harder, longer short circuit events. If the control circuitry 30 has increased the slope relative to the prior iteration (which occurs frequently), the control circuitry 30 may provide an additional increase to the current to clear the short circuit in a reasonable time (e.g., less than a threshold time).

The example control circuitry 30 determines whether the short circuit duration has exceeded a certain threshold based on the average short time (e.g., a certain multiplier of the average short time), the control circuitry 30 decreases the slope at a selected (e.g., predetermined) rate. For example, the control circuitry 30 may decrease the slope between 0.01 volts to 0.1 volts per 100 Amps, per 50 ms. Additionally or alternatively, the control circuitry 30 may increase the current during long short circuit events by changing to a constant current control loop during a ramp, instead of remaining in the constant voltage process. For example, after the short circuit event duration exceeds a threshold, the control circuitry 30 further increases the current to clear the short circuit quickly. The current increase may be linear, exponential, and/or using any other function or technique to increase the current so as to reduce arc instability.

In an operational example, a threshold short circuit duration of 200 percent of the average short circuit duration, and the slope ramp rate of 0.02V per 100 A/50 μs or 0.4V per 100 A/1 ms when the short circuit duration exceeds the threshold short circuit duration. For an average short circuit duration of 2 ms, after the short circuit event has lasted for 4 ms, the control circuitry 30 begins decreasing the slope parameter by 0.02V/100 A every 50 μs after 4 ms. As a result, the peak current is permitted to be increased, and the short circuit event is cleared faster than if the slope parameter was maintained. As a result, the arc has improved stability with movements relative to the puddle and/or workpiece, and regardless of changes in stickout. The increase in stability is believed to be due to reduction in long short circuit times that create substantial resistive heating in the wire. Without the reduction in short circuit clearing time, when the short circuit event is finally cleared, a portion of the wire is superheated and the arc may flare back. The superheating of the wire is exacerbated as the stickout increases, because the length of superheated wire is enlarged (e.g., due to the added resistance from an increased stickout). By reducing the slope after a long short circuit event, the control circuitry 30 reduces the resistive heating of the wire, thereby stabilizing the arc.

Figure 7:
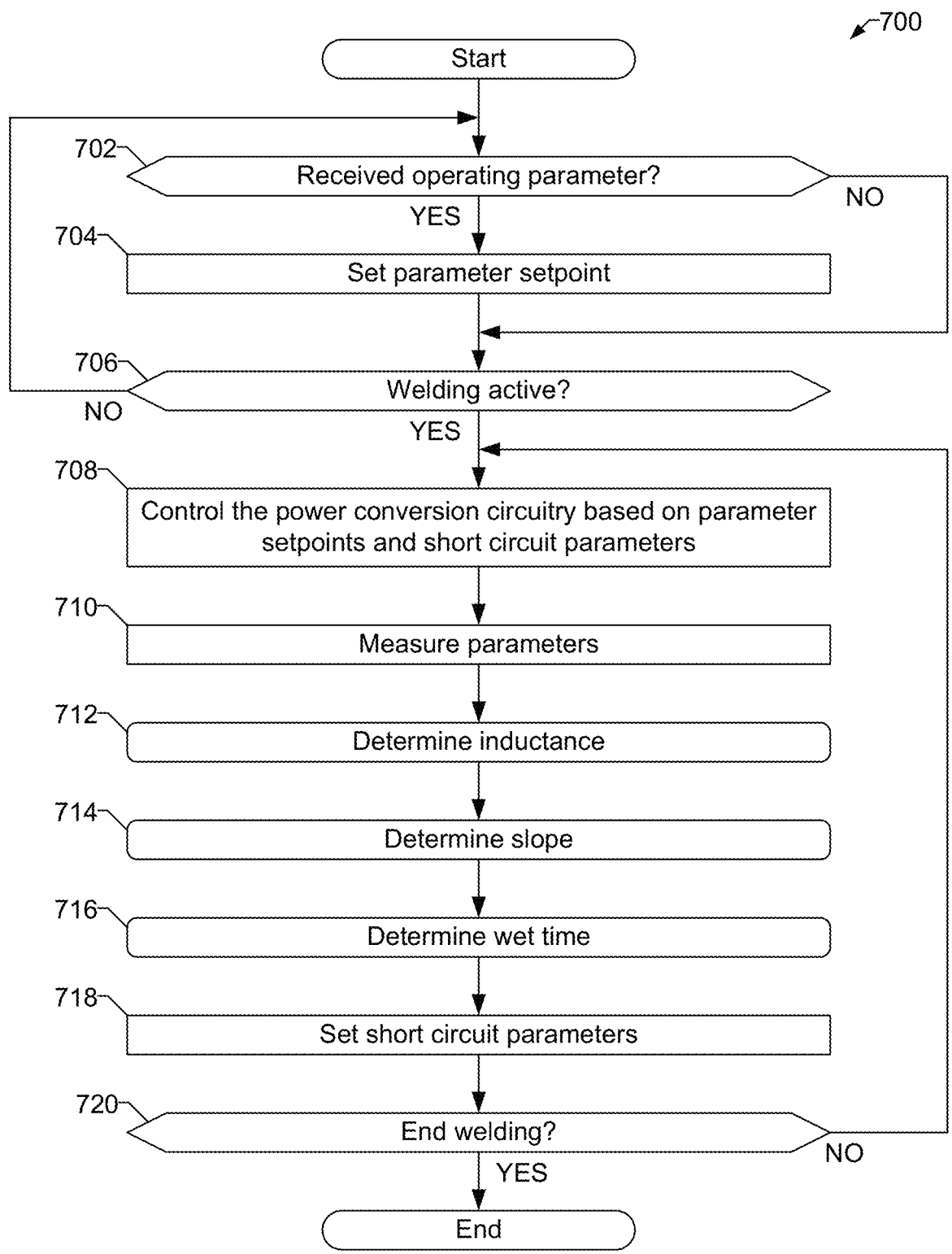
FIG. 7 is a flow chart representative of example machine readable instructions which may be executed to implement the welding-type power supply of FIG. 2 to control parameters of a short arc welding process.

FIG. 7 is a flow chart representative of example machine readable instructions 700 which may be executed to implement the welding-type power supply 12 of FIG. 2 to control parameters of a short arc welding process. The example machine-readable instructions 700 may be stored in the memory 37 and/or executed by the example control circuitry 30 of FIG. 2.

At block 702, the control circuitry 30 determines whether or not an operating parameter has been received. The operating parameter may be a voltage setpoint and/or a wire feed speed setpoint. If an operating parameter has been received (block 702), at block 704 the control circuitry 30 sets the parameter setpoint based on the received operating parameter. After setting the parameter setpoint (block 704), or if an operating parameter has not been received (block 702), at block 706 the control circuitry 30 determines whether or not welding is occurring. For example, the control circuitry 30 may determine whether a trigger of the welding torch 16 is depressed and/or whether welding-type current is being output from the power conversion circuitry 32.

If the welding is active (block 708), at block 708 the control circuitry 32 controls the power conversion circuitry 32 based on parameter setpoints and/or short circuit parameters. Example short circuit parameters include inductance, slope and/or wet time. The control circuitry 30 may control the power conversion circuitry 32 (e.g., controlling switching elements and/or other components of the power conversion circuitry 32 to output the desired voltage and/or current).

At block 710, the control circuitry 30 measures parameters of the welding operation. Example measured parameters may include voltage, current, and/or short circuit phase durations. At block 712, the control circuitry 30 determines the value of the inductance parameter. For example, the control circuitry 30 may determine an updated value for the inductance parameter based on a measured output voltage from block 710, a commanded output voltage for a voltage control loop executed by the control circuitry 30, a measured short circuit event duration from block 710, and a measured current change during a short circuit event. Additionally or alternatively, the control circuitry 30 may determine an updated value for the inductance parameter by determining an inductance value that would cause an increase of an average peak short circuit current of one or more short circuit events during the welding-type operation over an average duration of the one or more short circuit events. Example instructions that may be executed to implement block 712 are described below with reference to FIG. 8.

At block 714, the control circuitry 30 determines the value of the slope parameter. For example, the control circuitry 30 may determine an updated value for the slope parameter based on a measured peak current during a short circuit event, a measured peak voltage during the short circuit event, and a commanded output voltage. Example instructions that may be executed to implement block 714 are described below with reference to FIG. 9.

At block 716, the control circuitry 30 determines the value of the wet time parameter. For example, the control circuitry 30 may determine the value of the wet time parameter based on durations of one or more short circuit events in which the durations are less than a threshold duration. Example instructions that may be executed to implement block 716 are described below with reference to FIG. 10.

At block 718, the control circuitry 30 proceeds to set the short circuit parameters determined in blocks 712, 714, and 716. At block 720, the control circuitry 30 determines whether welding has ended. If the welding is not ended (block 720), the control circuitry 30 returns control to block 708 to continue controlling the power conversion circuitry 32. If the welding process has ended (block 720), the control circuitry 30 stops the welding process and the example instructions 700 may end. In some examples, the control circuitry 30 returns control to block 702 to await further operating parameter inputs and/or perform further welding operations. Determination of the inductance parameter (block 712), the slope parameter (block 714), and/or the wet time parameter (block 716) may each be performed on every iteration of the example instructions 700, on alternating or cycling iterations of the example instructions, and/or any other schedule. Additionally or alternatively, the determined parameters may be activated and/or deactivated for portions of the weld, such that setting the short circuit parameters (block 718) may be skipped or omitted for some iterations of the instructions 700.

Figure 8:
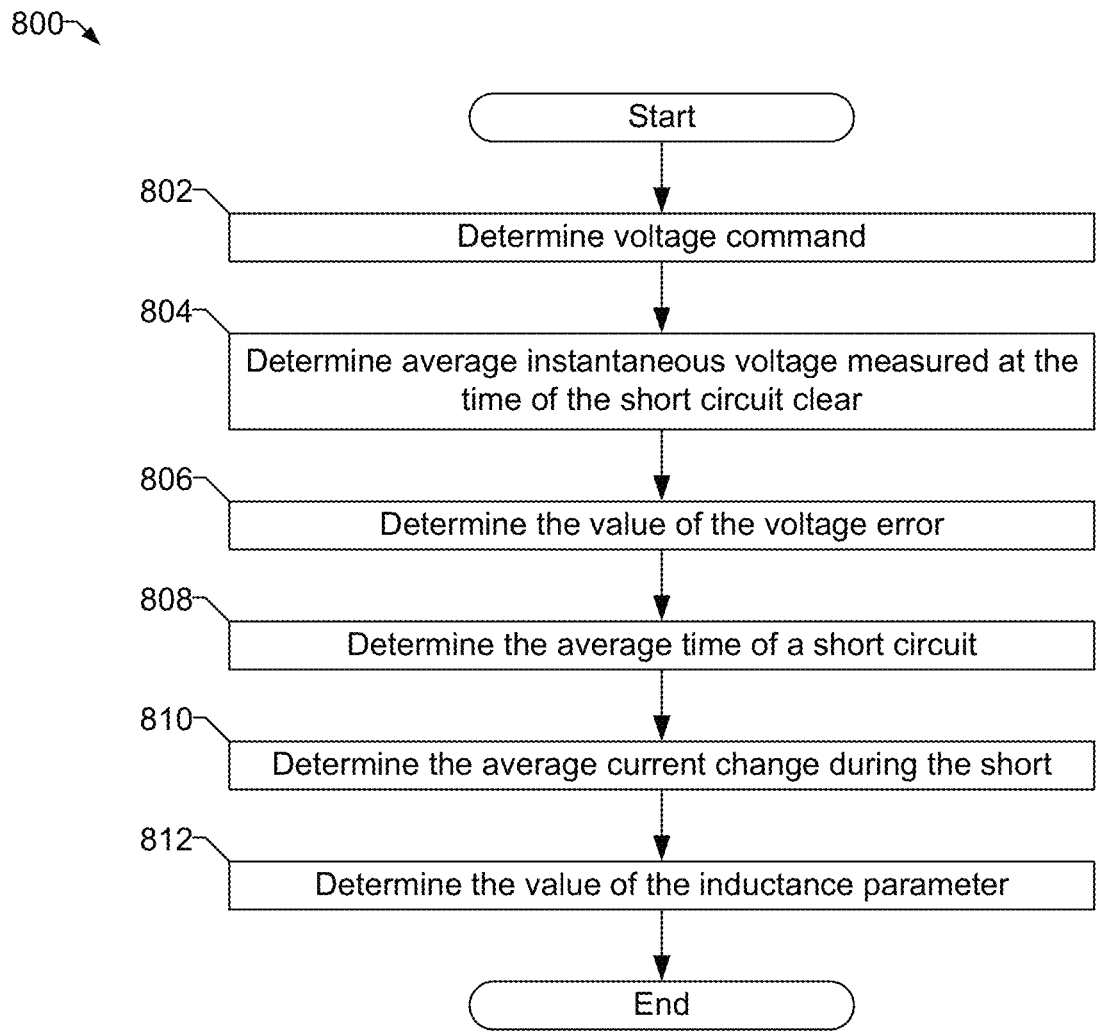
FIG. 8 is a flow chart representative of example machine readable instructions which may be executed to implement the welding-type power supply of FIG. 2 to determine the value of an inductance parameter.

FIG. 8 is a flow chart representative of example machine readable instructions 800 which may be executed to implement the welding-type power supply 12 of FIG. 2 to determine the value of an inductance parameter. The instructions 800 may be used to implement block 712 of FIG. 7 to determine an updated inductance parameter.

At block 802, the control circuitry 30 determines the voltage command. For example, the voltage command is used by the control circuitry 30 as an input to a voltage control loop for controlling the power conversion circuitry 32. At block 804, the control circuitry 30 determines the average instantaneous voltage measured at the time of the short circuit clear. For example, the control circuitry 30 may average the measured voltages at one or more previous short circuit clearing events to determine the average instantaneous voltage measured at the time of the short circuit clear. In some other examples, the median or other representative value of an expected instantaneous voltage may be used.

At block 806, the control circuitry 30 determines the value of the voltage error. For example, the control circuitry 30 may determine the voltage error as a difference between the voltage command and the average instantaneous voltage. At block 808, the control circuitry 30 determines the average time of a short circuit event. For example, the control circuitry 30 may average the measured short circuit event durations at one or more previous short circuit events to determine the average time of the short circuit event. In some other examples, the median or other representative value of an expected short circuit event duration may be used.

At block 810, the control circuitry 30 determines the average current change during the short circuit events. For example, the control circuitry 30 may average the measured short circuit current change at one or more previous short circuit events to determine the average current change over the short circuit event. In some other examples, the median or other representative value of an expected short circuit current change may be used.

At block 812, the control circuitry 30 determines the value of the inductance parameter. For example, the control circuitry 30 may use Equation 2 above to calculate an updated inductance parameter. Alternatively, the control circuitry 30 may calculate the updated inductance parameter as an inductance value that would cause an increase of an average peak short circuit current (e.g., the average current while the arc is present+the average current change during the short circuit) of one or more short circuit events during the welding-type operation over an average duration of the one or more short circuit events. After calculating the value of the inductance parameter (block 812), the example instructions 800 end and the control circuitry 30 returns control to block 714 of FIG. 7.

Figure 9:
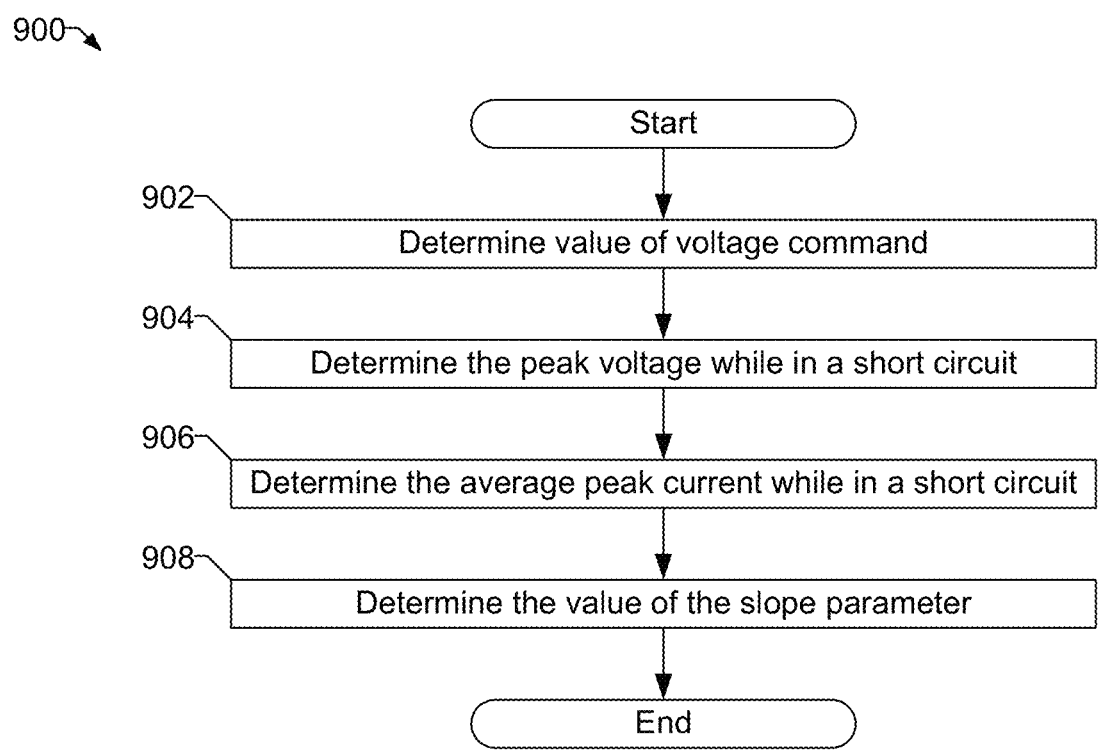
FIG. 9 is a flow chart representative of example machine readable instructions which may be executed to implement the welding-type power supply of FIG. 2 to determine the value of a slope parameter.

FIG. 9 is a flow chart representative of example machine readable instructions 900 which may be executed to implement the welding-type power supply 12 of FIG. 2 to determine the value of a slope parameter. The instructions 900 may be used to implement block 714 of FIG. 7 to determine an updated slope parameter.

At block 902, the control circuitry 30 determines the value of the voltage command. At block 904, the control circuitry 30 determines the peak voltage while in a short circuit. The peak voltage may be an average peak voltage, a median peak voltage, and/or any other value representative of the peak voltage for one or more prior short circuit events.

At block 906, the control circuitry 30 determines the value of the average peak current while in a short circuit. The peak current may be an average peak current, a median peak current, and/or any other value representative of the peak current for one or more prior short circuit events. At block 908, the control circuitry 30 determines the value of the slope parameter based on the voltage command, the peak voltage, and the peak current. For example, the control circuitry 30 may determine the updated value for the slope parameter based on Equation 4 below:

$$S = \frac{(V_{cmd} - V_{peak})}{I_{peak}} \quad \text{Equation 4}$$

In Equation 4, S is the updated value for the slope parameter, $V_{cmd}$ is the voltage command, $V_{peak}$ is the measured peak voltage during the short circuit event, and $I_{peak}$ is the measured peak current (in hundreds of Amps) during the short circuit event. After calculating the value of the inductance parameter (block 908), the example instructions 900 end and the control circuitry 30 returns control to block 716 of FIG. 7.

Figure 10:
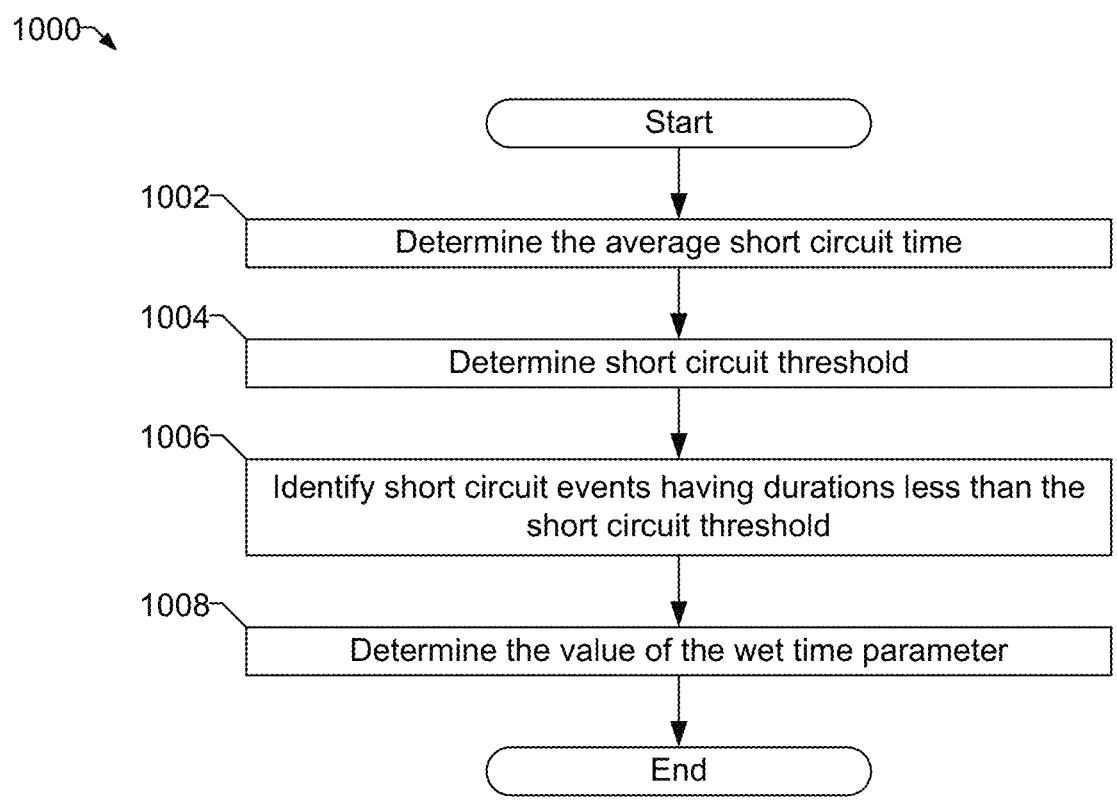
FIG. 10 is a flow chart representative of example machine readable instructions which may be executed to implement the welding-type power supply of FIG. 2 to determine the value of a wet time parameter.

FIG. 10 is a flow chart representative of example machine readable instructions 1000 which may be executed to implement the welding-type power supply 12 of FIG. 2 to determine the value of a wet time parameter. The instructions 1000 may be used to implement block 716 of FIG. 7 to determine an updated wet time parameter.

At block 1002, the control circuitry 30 determines the value of the average short circuit duration. In some examples, a median short circuit duration and/or any other value representative of the short circuit duration for one or more prior short circuit events may be used. At block 1004, the control circuitry 30 determines the value of the short circuit threshold. The short circuit threshold may be a percentage or multiple of the average short circuit time, an absolute time, or any other threshold. At block 1006, the control circuitry 30 identifies one or more of the short circuit events having durations less than the short circuit threshold.

At block 1008, the control circuitry 30 determines the value of the wet time parameter. For example, the control circuitry 30 may determine the updated value for the wet time parameter based on an average of the identified one or more short circuit events that are shorter than the short circuit threshold. After determining the value of the wet time parameter (block 1008), the instructions 1000 end and the control circuitry 30 returns control to block 718 of FIG. 7.

Figure 11:
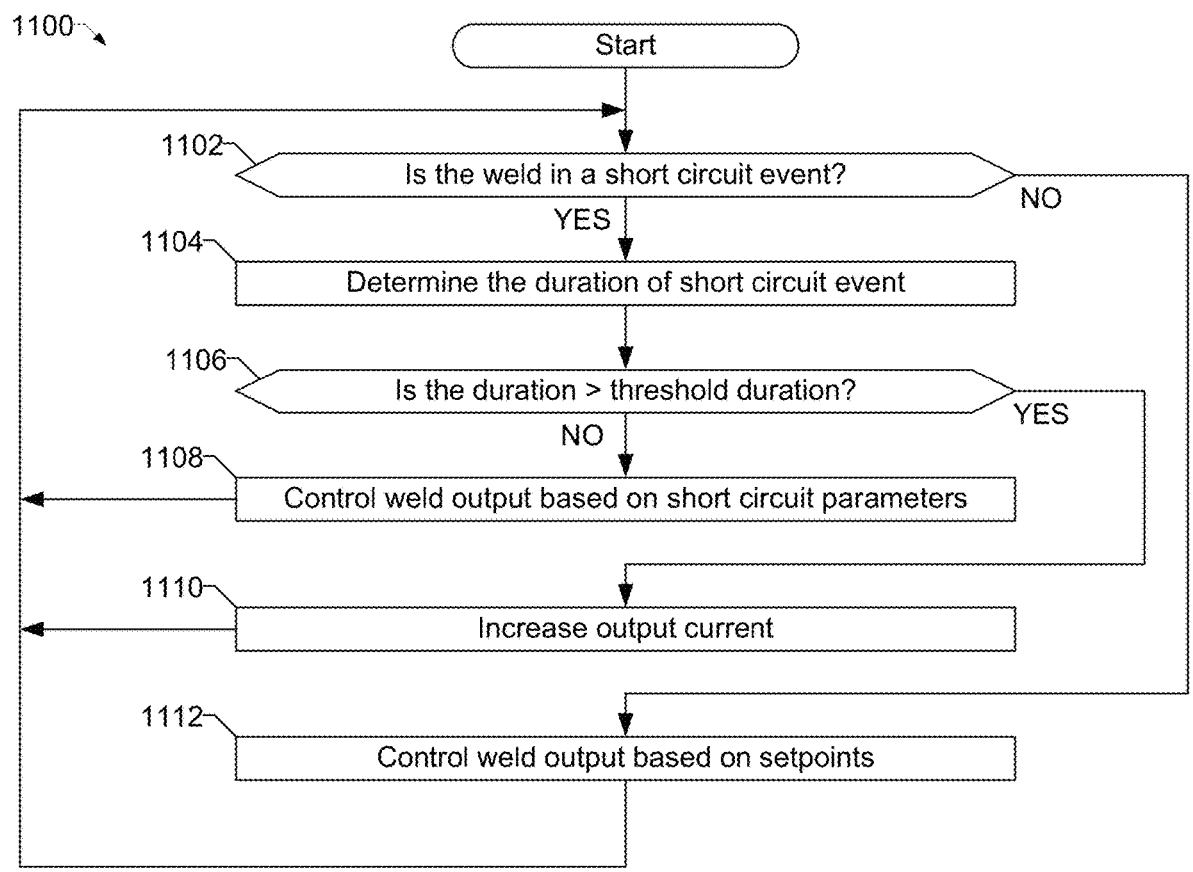
FIG. 11 is a flow chart representative of example machine readable instructions which may be executed to implement the welding-type power supply of FIG. 2 to control short circuit arc welding.

FIG. 11 is a flow chart representative of example machine readable instructions 1100 which may be executed to implement the welding-type power supply 12 of FIG. 2 to control short circuit arc welding. The instructions 1100 may be used to, for example, implement block 708 of FIG. 7 to control the power conversion circuitry 32 to maintain arc stability.

At block 1102, the control circuitry 30 determines whether the weld is in a short circuit event (e.g., based on the arc voltage). If the weld is in a short circuit even (block 1102), at block 1104 the control circuitry 30 determines the duration of the short circuit event. For example, the control circuitry 30 may monitor a duration of each short circuit event based on a time at which the short circuit event is detected. At block 1106, the control circuitry 30 determines whether the duration of the short circuit event is at least a threshold duration. An example threshold duration is based on an average duration of prior short circuit events during the weld.

If the duration of the short circuit event is less than the threshold duration (block 1106), at block 1108 the control circuitry 30 controls the power conversion circuitry 32 to control the weld output based on short circuit parameters (e.g., inductance, slope, and/or wet time parameters). On the other hand, if the duration of the short circuit event is at least the threshold duration (block 1106), at block 1110 the control circuitry 30 controls the power conversion circuitry 32 to increase the output current. For example, the control circuitry 30 may cause the output current to increase above an upper short circuit current limit, which may be explicitly set and/or effectively set based on a value of the slope parameter. Additionally or alternatively, the control circuitry 30 may omit or bypass the slope parameter to cause the output current to increase using a time-based relationship (e.g., a linear function, an exponential function, a step function, etc.).

If the weld is not in a short circuit event (block 1102), at block 1112 the control circuitry 30 controls the weld output based on the setpoints, such as the voltage setpoint, the wire feed speed setpoint, and/or the current setpoint.

After controlling the weld output based on the short circuit parameters (block 1108), increasing the output current (block 1110), or controlling the weld output based on the setpoints (block 1112), control may return to block 1102 to continue controlling the weld. In some examples, the instructions 1100 end when the weld is completed.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application-specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   power conversion circuitry configured to convert input power to welding-type power; and
   a controller configured to control the power conversion circuitry based on a plurality of short circuit parameters, the short circuit parameters comprising at least one of an inductance parameter, a slope parameter, or a wet time parameter by, during a welding-type operation:
   measuring an output from the power conversion circuitry; and
   setting updated values for at least one of the inductance parameter, the slope parameter, or the wet time parameter, to control the power conversion circuitry.

2. The welding-type power supply as defined in claim 1, wherein the controller is configured to set an updated value for the inductance parameter based on a measured output voltage, a commanded output voltage, a measured short circuit event duration, and a measured current change during a short circuit event.

3. The welding-type power supply as defined in claim 2, wherein the controller is configured to set the updated value for the inductance parameter based on the following equation:

$$L = \frac{V}{d_i} d_t,$$

where L is the updated value of the inductance parameter, V is a difference between the commanded output voltage and a representative output voltage value for one or more short circuit clearing events, $d_t$ is a representative short circuit event duration, and $d_i$ is a representative current change for one or more short circuit events.

4. The welding-type power supply as defined in claim 3, wherein the representative output voltage value is an average instantaneous voltage measured at the times the one or more short circuit events were cleared, the representative short circuit event duration is an average short circuit event duration, and the representative current change is an average current change during the one or more short circuit events.

5. The welding-type power supply as defined in claim 1, wherein the controller is configured to set an updated value for the inductance parameter by determining an inductance value that would cause an increase of an average peak short circuit current of one or more short circuit events during the welding-type operation over an average duration of the one or more short circuit events.

6. The welding-type power supply as defined in claim 1, wherein the controller is configured to set an updated value for the slope parameter based on a measured peak current during a short circuit event, a measured peak voltage during the short circuit event, and a commanded output voltage.

7. The welding-type power supply as defined in claim 6, wherein the controller is configured to set the updated value for the slope parameter based on the following equation:

$$S = \frac{(V_{cmd} - V_{peak})}{I_{peak}},$$

where S is the updated value for the slope parameter, $V_{cmd}$ is the voltage command, $V_{peak}$ is the measured peak voltage during the short circuit event, and $I_{peak}$ is the measured peak current during the short circuit event.

8. The welding-type power supply as defined in claim 7, wherein the controller is configured to set the updated value for the slope parameter based on the following equation:

$$S = \frac{(V_{cmd} - V_{peak})}{I_{peak}},$$

where S is the updated value for the slope parameter, $V_{cmd}$ is the voltage command, $V_{peak}$ is the average measured peak voltage during one or more short circuit events including the short circuit event, and $I_{peak}$ is the measured peak current during the one or more short circuit events.

9. The welding-type power supply as defined in claim 1, wherein the controller is configured to set an updated value for the wet time parameter based on durations of one or more short circuit events in which the durations are less than a threshold duration.

10. The welding-type power supply as defined in claim 9, wherein the threshold duration is based on a representative short circuit event duration.

11. The welding-type power supply as defined in claim 9, wherein the controller is configured to set the updated value by:
    determining an average short circuit duration for the one or more short circuit events during the welding-type operation;
    determining the threshold duration based on the average short circuit duration;
    identifying one or more of the short circuit events having durations less than the threshold duration; and
    determining the wet time parameter based on an average of the identified one or more short circuit events.

12. The welding-type power supply as defined in claim 1, wherein the controller is configured to reduce the slope parameter in response to a duration of a short circuit event exceeding a threshold duration.

13. A method, comprising:
    converting, via power conversion circuitry, input power to welding-type power during a welding-type operation;
    measuring, via control circuitry, an output from the power conversion circuitry during the welding-type operation;
    setting, via control circuitry, updated values for at least one of an inductance parameter, a slope parameter, or a wet time parameter, to control the power conversion circuitry during the welding-type operation; and
    controlling, during the welding-type operation via control circuitry, the power conversion circuitry based on the at least one of the inductance parameter, the slope parameter, or the wet time parameter.

14. The method as defined in claim 13, wherein the setting of the value for the inductance parameter is based on a measured output voltage, a commanded output voltage, a measured short circuit event duration, and a measured current change during a short circuit event.

15. The method as defined in claim 14, wherein the setting of the value for the inductance parameter is based on the following equation:

$$L = \frac{V}{d_i} d_t,$$

where L is the updated value of the inductance parameter, V is a difference between the commanded output voltage and a representative output voltage value for one or more short circuit clearing events, $d_t$ is a representative short circuit event duration, and $d_i$ is a representative current change for one or more short circuit events.

16. The method as defined in claim 13, wherein the setting of the value for the slope parameter is based on a measured peak current during a short circuit event, a measured peak voltage during the short circuit event, and a commanded output voltage.

17. The method as defined in claim 16, wherein the setting of the value for the slope parameter is based on the following equation:

$$S = \frac{(V_{cmd} - V_{peak})}{I_{peak}},$$

where S is the updated value for the slope parameter, $V_{cmd}$ is the voltage command, $V_{peak}$ is the measured peak voltage during the short circuit event, and $I_{peak}$ is the measured peak current during the short circuit event.

18. The method as defined in claim 13, wherein the setting of the value of the wet time parameter is based on durations of one or more short circuit events in which the durations are less than a threshold duration.

19. The method as defined in claim 18, wherein the threshold duration is based on a representative short circuit event duration.

20. The method as defined in claim 18, wherein the setting of the value of the wet time parameter comprises:
   determining an average short circuit duration for the one or more short circuit events during the welding-type operation;
   determining the threshold duration based on the average short circuit duration;
   identifying one or more of the short circuit events having durations less than the threshold duration; and
   determining the wet time parameter based on an average of the identified one or more short circuit events.

* * * * *